(12) United States Patent
Aimoto et al.

(10) Patent No.: US 7,953,007 B2
(45) Date of Patent: May 31, 2011

(54) EXCESSIVE FLOW DETECTION DEVICE, EXCESSIVE FLOW DETECTION CIRCUIT, TERMINAL APPARATUS AND NETWORK NODE

(75) Inventors: Takeshi Aimoto, Kawasaki (JP); Yoshinori Watanabe, Chigasaki (JP)

(73) Assignee: ALAXALA Networks Corporation, Kanagawa (JP)

( * ) Notice: Subject to any disclaimer, the term of this patent is extended or adjusted under 35 U.S.C. 154(b) by 676 days.

(21) Appl. No.: 12/022,436

(22) Filed: Jan. 30, 2008

(65) Prior Publication Data
US 2009/0022053 A1    Jan. 22, 2009

(30) Foreign Application Priority Data
Jul. 19, 2007   (JP) ................................. 2007-187835

(51) Int. Cl.
*H04L 12/56*   (2006.01)
(52) U.S. Cl. .................. 370/230.1; 370/395.32; 370/471
(58) Field of Classification Search ....... 370/229–230.1, 370/235, 351, 389, 392, 394, 395.32, 470–472; 709/234–235
See application file for complete search history.

(56) References Cited

U.S. PATENT DOCUMENTS

| | | | | |
|---|---|---|---|---|
| 7,133,406 B2 * | 11/2006 | Konuma | ................... | 370/395.42 |
| 7,626,990 B2 * | 12/2009 | Wybenga et al. | .......... | 370/395.7 |
| 7,715,419 B2 * | 5/2010 | Tatar et al. | .................... | 370/419 |
| 7,756,826 B2 * | 7/2010 | Bots et al. | ...................... | 707/624 |
| 2004/0100956 A1 * | 5/2004 | Watanabe | ..................... | 370/389 |
| 2008/0155697 A1 * | 6/2008 | Zuk | ................................ | 726/25 |

FOREIGN PATENT DOCUMENTS

| | | |
|---|---|---|
| JP | 2000-349812 | 12/2000 |
| JP | 2005-285048 | 10/2005 |

* cited by examiner

*Primary Examiner* — William Trost, IV
*Assistant Examiner* — Roberta A Shand
(74) *Attorney, Agent, or Firm* — Antonelli, Terry, Stout & Kraus, LLP.

(57) ABSTRACT

A packet information extraction circuit derives predetermined key information (for example, destination information or transmission source information) from a received packet. A HASH result computation circuit generates m (a plurality of) pseudo-random numbers (HASH results) of fixed length from the derived information. A cache table holds the key information and cumulative packet lengths within a predetermined time period by using the generated pseudo-random numbers as addresses. When a threshold value holding and comparing circuit senses that the cumulative packet length has exceeded a value held therein, it sends a notification signal to judgment means disposed in a packet exchange system. The key information items and the cumulative values of the packet lengths are stored in the cache table on the basis of the received packets in such a way that larger cumulative packet lengths are left behind, whereas smaller cumulative packet lengths are erased.

18 Claims, 7 Drawing Sheets

EXCESSIVE FLOW DETECTION DEVICE, EXCESSIVE FLOW DETECTION CIRCUIT, TERMINAL APPARATUS AND NETWORK NODE

BACKGROUND OF THE INVENTION

1. Field of the Invention

The present invention relates to an excessive flow detection circuit, a terminal apparatus and a network node. More particularly, it relates to an excessive flow detection circuit in the transmission terminal of fixed-length or variable-length packets or a network node (a router or the like), and such a terminal apparatus and network node.

2. Description of the Related Art

In the "Triple Play" being a Next Generation Network (NGN), a plurality of services are integrated on an identical network (IP network), and also a service which transfers the stream type traffic of telephonic voices, broadcasting videos etc. is rendered through the Internet Protocol (IP) network. In such a service which transfers the stream type traffic of voices, videos etc., it is required to transfer the traffic with high communication qualities (low delay, low fluctuation and low loss). Therefore, needs for techniques which guarantee the communication qualities have risen for the IP network. The development and installation of Quality of Service (QoS) control technology which can control the transfer with the qualities guaranteed have been required also of individual nodes (routers or the likes) constituting the IP network.

Basically, it is general in the node (router or the like) to transfer the traffic of voices, videos etc. by a PRIORITY CONTROL relative to a data type traffic. In, for example, an ATM network being a related-art technique, a traffic class called "CBR (Constant Bit Rate)" has been applied. With the mere application of the PRIORITY CONTROL, however, there is the risk that an excessive traffic wider than the maximum band supposed and set as the stream type traffic beforehand might flow in by a cause such as the setting error of a network manager or a malicious attack from a user, and it is sometimes impossible to prevent the excessive traffic. The occurrence of the inflow is influential on the communication qualities of the majority general users who are communicating while observing normal traffic standards. The installation of band monitoring and controlling functions has been simultaneously required in order to prevent the influences.

A UPC function (policer function) has been generally known as the band monitoring function in the node (router or the like). The UPC function is a general-purpose function for monitoring a band in the node (router or the like), and it decides whether or not a flow rate exceeds the band which an operation manager has set every flow, every flow (for example, every session of a telephonic conversation) to-be-handled (refer to, for example, Patent Document 1 being JP-A-2000-349812, which shall be termed "related-art technique 1" below).

Meanwhile, data analysis means includes a fast extraction technique wherein frequent item sets are extracted from data in a plurality of combinations which are utilized for a basket analysis etc. The fast extraction technique is a method wherein the data in the plurality of combinations are applied to the combinations (frequent item sets) of a sender address, a receiver address, a port No., etc. The data analysis method is a general-purpose function, and it extracts the (plurality of) major frequent item sets fast from among the data in the plurality of combinations. The algorithm has the merit that the installable amount of resources is a fixed scale which is not proportional to the number of flows (refer to, for example, Patent Document 2 being JP-A-2005-285048 and Non-patent Document 1 being "Stream Mining for Network Management" by Kenichi YOSHIDA et al., IEICE TRANS, COMMUN., VOL. E89-B, NO. 6, JUNE 2006, which shall be termed "related-art technique 2" below).

SUMMARY OF THE INVENTION

As stated before, the UPC function (related-art technique 1) decides whether or not the flow rate has exceeded the set band, every flow (for example, every session of the telephonic conversation) to-be-handled. Therefore, the related-art technique 1 requires resources such as memory areas in which set parameters separate for the respective flows are retained, and it has the problem that the installation amount of resources in the apparatus enlarges in proportion to the number of the flows, etc. In a packet exchange system, terminals the number of which exceeds, for example, 1000 are sometimes connected through switches, and when the bands are monitored and retained for the respective flows, the same number of fields are required in a memory.

The increase of the amount of resources forms a bottleneck in installation in the case of adding the band monitoring function as the check function in the PRIORITY CONTROL stated before. Besides, the memory resources for holding the set parameters of the respective flows of a UPC circuit needs must be more expanded with those increases of the stream type services and the number of flows of each traffic which are expected in the future. Therefore, in the case where the UPC function is installed in the packet exchange system as an excessive traffic detection circuit for a large number of stream type data, the resources scale and cost of the installation circuit become serious problems.

Besides, as stated before, the data analysis method (related-art technique 2) extracts the (plurality of) major frequent item sets fast from among the data in the plurality of combinations. The algorithm has the merit that the installation amount of resources is in a small scale without being proportional to the number of flows. Since, however, the algorithm is configured for the purpose of extracting the major frequent item sets on the basis of a plurality of key information items and detecting a plurality of major frequent flows as to the identical item set, the size of a cache table sometimes becomes large.

In the present invention, a band monitoring function is applied only to a stream type traffic, whereby the packet information field of the frequent item sets thereof can be limited and fixed to one field, and the maximum flows in an excessive flow at the pertinent point of time are sequentially specified one by one. In accordance with the specification, the frequent flows may be detected in only the specified packet information field (of, for example, sender addresses), and hence, an installation scale can be sharply reduced still further as compared with that of the related-art technique 2.

In view of the above, the present invention has for its main object to provide an excessive flow detection circuit, a terminal apparatus and a network node in which a band monitoring function for monitoring the existence or nonexistence of an excessive traffic wider than a band supposed and set beforehand (the detection of the excessive traffic) is installed with a small-scale circuit that does not depend upon the magnitude of the number of flows. Besides, another object of the invention is to provide that degeneracy scheme of the algorithm of the related-art technique 2 which is the optimal to the main object (and in which item sets are simplified, and a detection criterion is a flow exceeding the supposed amount), for the purpose of minimization.

Another object of the invention is to incarnate the function of receiving stream type traffics of which a steady band value can be expected, and sequentially detecting excessive traffics which exceed a preset upper-limit throughput value, by an installation aspect in a small amount of resources as is fixed without depending upon the magnitude of the number of flows.

By way of example, the invention includes means (means 1) for deriving necessary KEY information from a received packet, arithmetic means (means 2) for generating m (a plurality of) pseudo-random numbers of fixed length from the information derived by the means 1, and storage means (means 3) for holding the KEY information and cumulative packet lengths with addresses being the pseudo-random numbers generated by the means 2, and it further includes a sensing circuit (means 5) which senses that the cumulative packet length has exceeded a value held in a threshold value holding circuit (means 4), and a timer (means 6) which measures a fixed time period.

In a packet exchange system, the excessive flow sensing scheme of the invention has as one of its features, to derive KEY information which is formed of the specified field value of packet information to-be-handled, to count up the cumulative value of packet lengths on the basis of the KEY information and every packet of the identical KEY information, to decide whether or not the packet-length cumulative value has exceeded a preset threshold value within a unit time period, and to send a notification signal to judgment means disposed in the packet exchange system, in a case where the cumulative value has exceeded the threshold value.

The excessive flow sensing scheme has as one of its features, to employ a timer circuit for the purpose of measuring the unit time period.

The excessive flow sensing scheme has as one of its features, to have an agreement decision function for an identifier which serves to first decide whether or not the packet information to-be-handled becomes a packet for excessive flow detection.

The excessive flow sensing scheme has as one of its features, to employ destination information as the KEY information in a packet information extraction circuit, for an output packet from the packet exchange system.

The excessive flow sensing scheme has as one of its features, to employ transmission source information as the KEY information in the packet information extraction circuits for an input packet to the packet exchange system.

The excessive flow sensing scheme has as one of its features, to obtain representative values by employing a functional circuit by which numerical values representative of the KEY information are computed from this KEY information, to include a cache table in which the KEY information and the cumulative values are held with addresses being the obtained representative values, to access the cache table with the representative value as the address and check agreement with the KEY information read out, to update the cumulative value in case of the agreement, and to update the KEY information anew and write the packet length thereof into a cumulative value field in case of disagreement.

The excessive flow sensing scheme has as one of its features, to include a circuit which outputs two or more of the representative values from the functional circuit, to repeat the processing of the respective representative values for the cache table, to check agreement with the KEY information read out, to update the cumulative values in case of the agreement, and to update the KEY information anew and write the packet length thereof into the cumulative value field, for the minimum entry of the cumulative value field within the cumulative value field, in case of disagreement.

The packet exchange system has as one of its features, that the upper-limit throughput values of flow units in a stream type traffic are set in a band control unit, instead of setting an upper-limit throughput value for all flows to-be-handled, whereby the KEY information is notified to an upper-layer protocol as the information of a violative user flow.

According to the first solving means of this invention, there is provided an excessive flow detection circuit comprising:

an extraction circuit to which a packet or header information of the packet is inputted, which derives predetermined key information from the header information of the packet, and which derives packet length information contained in the header information or which measures a packet length of the packet, thereby to obtain packet length information of the packet;

a representative value computation circuit which computes one or plurality of representative value from a plurality of predetermined values, on the basis of the key information derived by said extraction circuit;

a table which has a plurality of entries respectively corresponding to the plurality of values, and in which each of the entries holds key information and a cumulative value of the packet lengths;

a comparison circuit which compares the key information of the entry corresponding to the representative value computed by said representative value computation circuit and the key information derived by said extraction circuit, with reference to said table;

an addition circuit which adds the packet length information obtained by said extraction circuit, to the cumulative value of the packet lengths in the pertinent entry, in a case where the key information items have agreed in said comparison circuit; and a threshold value comparison circuit which notifies excessive flow detection and/or outputs the key information corresponding to the cumulative value, in a case where the cumulative value of the packet lengths stored in said table has exceeded a preset threshold value.

According to the second solving means of this invention, there is provided a terminal apparatus comprising:

a processing unit; and a line interface unit which includes the excessive flow detection circuit as defined in claim 1, and which communicates with a network;

wherein said excessive flow detection circuit inputs packets which are outputted from said processing unit toward the network or header information of the packets, and detects any excessive flow.

According to the third solving means of this invention, there is provided a network node comprising:

a first line interface unit for a terminal apparatus;

a second line interface unit for a network, which includes the excessive flow detection circuit as defined in claim 1; and a switching portion which is connected with said first line interface unit and with said second line interface unit;

wherein said excessive flow detection circuit detects any excessive flow as to packets from said switching portion toward the network, or/and packets from the network toward said switching portion.

According to the fourth solving means of this invention, there is provided a network node comprising:

a first line interface unit for a terminal apparatus;

a second line interface unit for a network;

the excessive flow detection circuit as defined in claim 1; and a switching portion which is connected with said first line interface unit, with said second line interface unit and with said excessive flow detection circuit;

wherein said excessive flow detection circuit inputs packets from said first line interface unit and/or said second line interface unit, or header information items of the packets through said switching portion, and detects any excessive flow.

According to the fifth solving means of this invention, there is provided a network node such as router or switch, comprising:

a statistic information totalizing function which totalizes statistic information, such as packet lengths or the number of packets, which corresponds to key information item that constitutes header parts or pay-load parts of the packet to be transferred;

wherein the statistic information totalizing function includes a function of totalizing the statistic information into a table which is addressed by a representative value computation function for the key information.

According to the invention, it is possible to provide an excessive flow detection circuit, a terminal apparatus and a network node in which a band monitoring function for monitoring the existence or nonexistence of an excessive traffic wider than a band supposed and set beforehand (the detection of the excessive traffic) is installed with a small-scale circuit that does not depend upon the magnitude of the number of flows. Besides, according to the invention, it is possible to provide that degeneracy scheme of the algorithm of the related-art technique 2 which is the optimal to the main object (and in which item sets are simplified, and a detection criterion is a flow exceeding the supposed amount), for the purpose of minimization.

According to the invention, it is possible to incarnate the function of receiving stream type traffics of which a steady band value can be expected, and sequentially detecting excessive traffics which exceed a preset upper-limit throughput value, by an installation aspect in a small amount of resources as is fixed without depending upon the magnitude of the number of flows.

DESCRIPTION OF THE PREFERRED EMBODIMENTS

There will be described a quality guaranteeing technique based on an excessive flow sensing scheme in the case where the stream type traffics of voices, videos etc. are transferred through an IP network.

(Ether Transmission Terminal)

Figure 2:
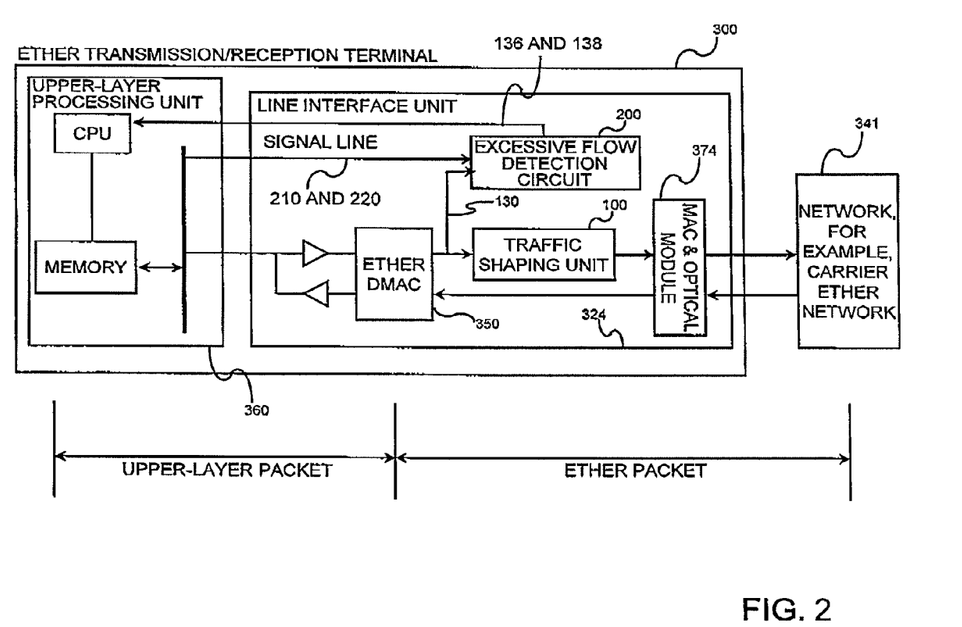
FIG. 2 is a configurational block diagram in the case where the excessive flow detection circuit is applied to a packet transmission/reception terminal.

FIG. 2 is a configurational block diagram in the case where an excessive flow detection circuit is applied to a packet transmission/reception terminal.

The Ether transmission/reception terminal (terminal apparatus) 300 includes, for example, an upper-layer processing unit (processing unit) 360 having a CPU and a memory, and a line interface unit 324 for a carrier Ether network 341. The upper-layer processing unit 360 allows the operation of an upper-layer protocol (for example, IP (Internet Protocol)) for transferring information by employing an Ether network, and it generates and terminates upper-layer packets which a still upper layer (for example, TCP protocol or application) can recognize.

The line interface unit 324 includes, for example, an Ether DMAC (Dynamic Memory Access Control) 350, a traffic shaping unit 100, a MAC & OPTICAL MODULE 374, and the excessive flow detection circuit (excessive flow detection device) 200.

The Ether DMAC (Dynamic Memory Access Control) 350 transmits and receives the upper-layer packets generated by the upper-layer processing unit 360, and Ether packets (each having a variable length of 64 bytes to 1500 bytes).

The traffic shaping unit 100 transmits the packets at transmission intervals which observe a band contracted with the carrier Ether network 341.

The MAC & OPTICAL MODULE 374 converts the Ether packets into a signal adapted for an optical fiber or the like physical line, and it transmits the signal to the network 341. Conversely, it converts a signal adapted for the optical fiber or the like physical line and received from the network 341, into Ether packets, and it transmits the Ether packets to the Ether DMAC 350.

The excessive flow detection circuit 200 monitors the band for the flows of voices and dynamic images, among traffics inputted to the traffic shaping unit 100, and when it senses any excessive flow, it notifies the excessive flow to the upper-layer processing unit 360. By way of example, the excessive flow detection circuit 200 detects the excessive flow by receiving through the Ether DMAC 350, the packets outputted from the upper-layer processing unit 360 toward the network 341, or the header information items of the packets. The upper-layer processing unit 360 performs the analysis of the cause of the excessive flow, the prevention of the transmission of the excessive flow, etc. in accordance with the notification.

Figure 3:
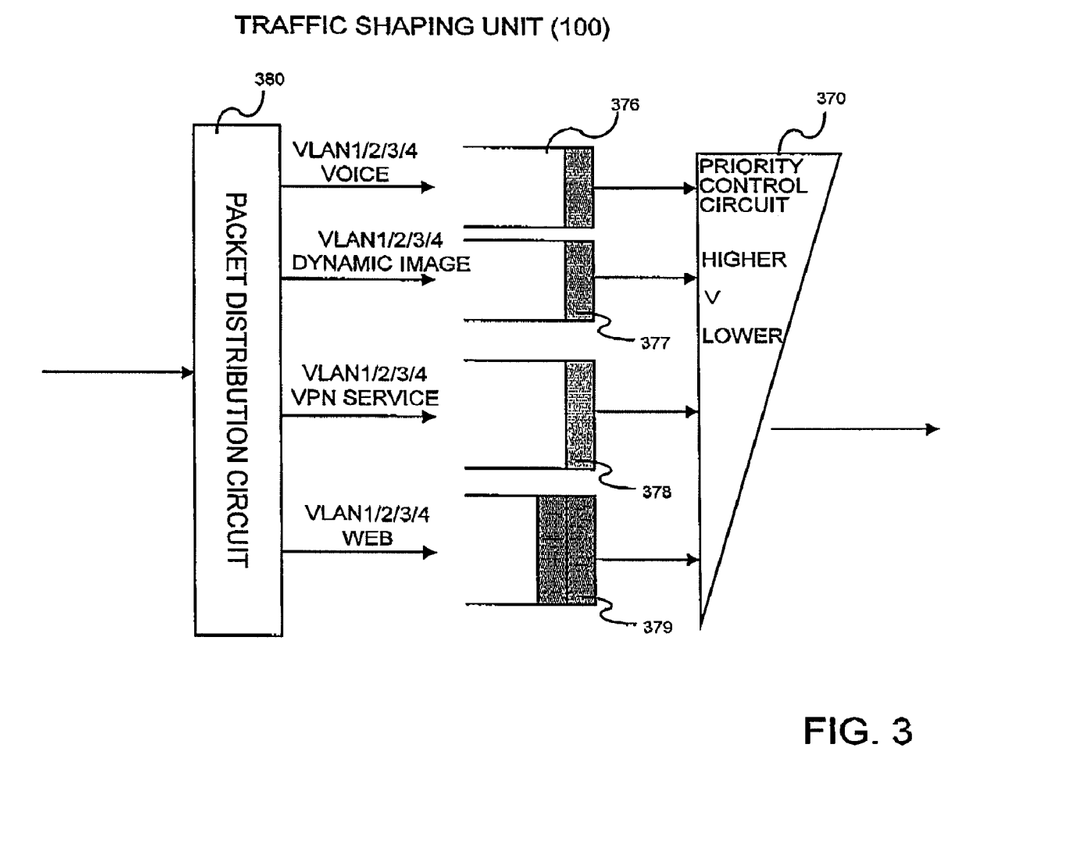
FIG. 3 is a configurational diagram of a traffic shaping circuit in the packet transmission/reception terminal.

FIG. 3 shows a configurational example of the traffic shaping unit 100.

The traffic shaping unit 100 has, for example, a plurality of queues 376-379, a distribution circuit 380 which distributes packets to the plurality of queues on the basis of priority levels contained in the header information items of the packets, and/or identification information items indicating packet sorts, and a readout circuit (PRIORITY CONTROL circuit) 370 which reads out the packets from the queues in accordance with the priority levels and then outputs the packets.

In the traffic shaping unit 100, the packet distribution circuit 380 classifies the output destination of the inputted packet on the basis of the identifier information contained in the packet header. Examples of the identifier information are the priority levels within the field of packet header information or the like (for example, the TOS (Type Of Service) of the IP protocol) and within the VLAN tag of an Ether datagram, and information (such as priority level information) affixed within the apparatus, for the packet. Incidentally, the packet may well be classified on the basis of any other information. The designation of the identifier information can be set by a network manager beforehand. It can be set through, for example, a signal line 220 in FIG. 1 or another signal line similar to the signal line 220 in FIG. 1.

The output destinations of the packet distribution circuit 380 are, for example, the queues 376 and 377 of the respective traffics of the voice and the dynamic image being stream type traffics, and the queues 378 and 379 of the respective traffics of a VPN (Virtual Private Network) service and a Web access being data type traffics. The packets are buffered in the respectively corresponding queues, and the readout circuit 370 outputs the packets in accordance with, for example, the PRIORITY CONTROL in which the packets existing in the queues of higher priority levels are read out. By way of example, the higher priority levels can be set in the order of the voice, dynamic image, VPN service and Web access as shown in FIG. 3. Incidentally, the priority levels may well be set on occasion.

The input packet information items of the stream type traffic queues 376 and 377 are inputted to the respectively corresponding excessive flow detection circuits 200 so as to check the existence or nonexistence of any excessive flow. Incidentally, each of the excessive flow detection circuits 200 may be supplied with the packets or the header information items thereof from the Ether DMAC 350, or it may well be supplied with the packets of predetermined priority level or packet sort from the distribution circuit 380 of the traffic shaping unit 100.

In this example, the operation of the excessive flow detection circuit 200 will be described on only the operation thereof for the voice queue 376. Since processing is similar as to the dynamic images (videos), it shall be omitted from description. Upon sensing the excessive flow, the excessive flow detection circuit 200 notifies the sensing to the CPU of the upper-layer processing unit 360. Then, the CPU of the upper-layer processing unit 360 analyzes and decides the cause of the excessive flow and gives a transmission prevention instruction, etc.

Figure 1:
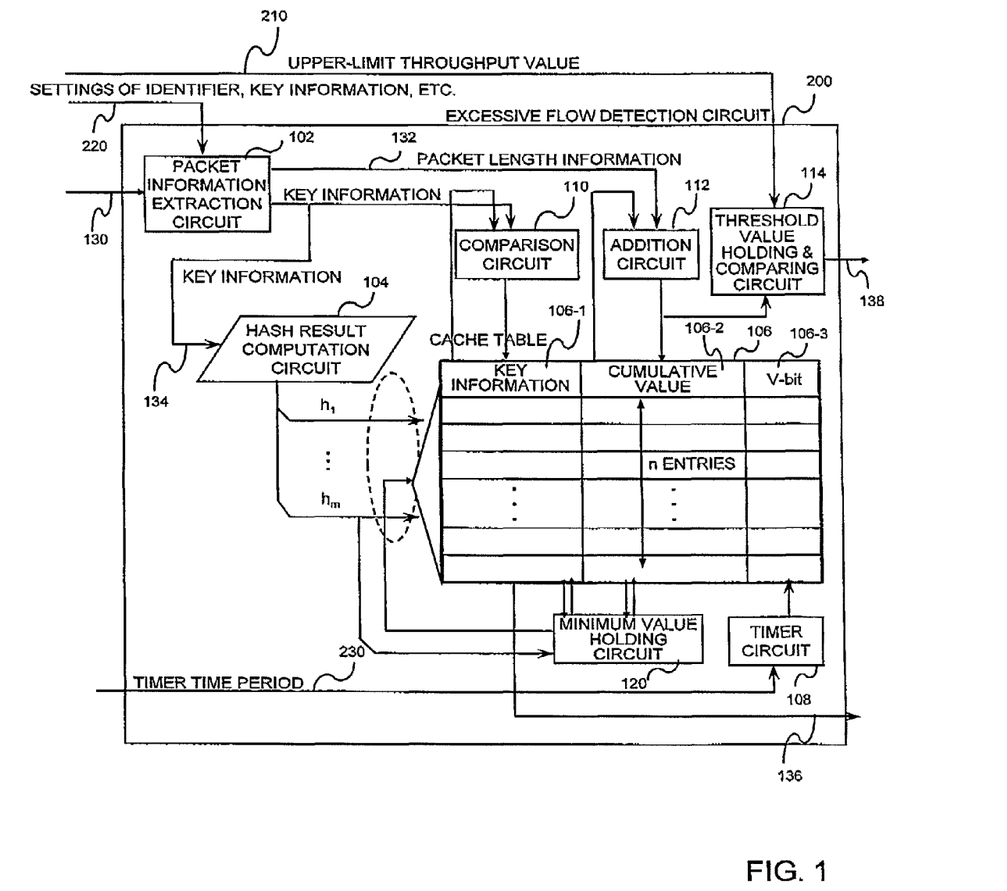
FIG. 1 is a configurational block diagram of an excessive flow detection circuit.
Figure 6:
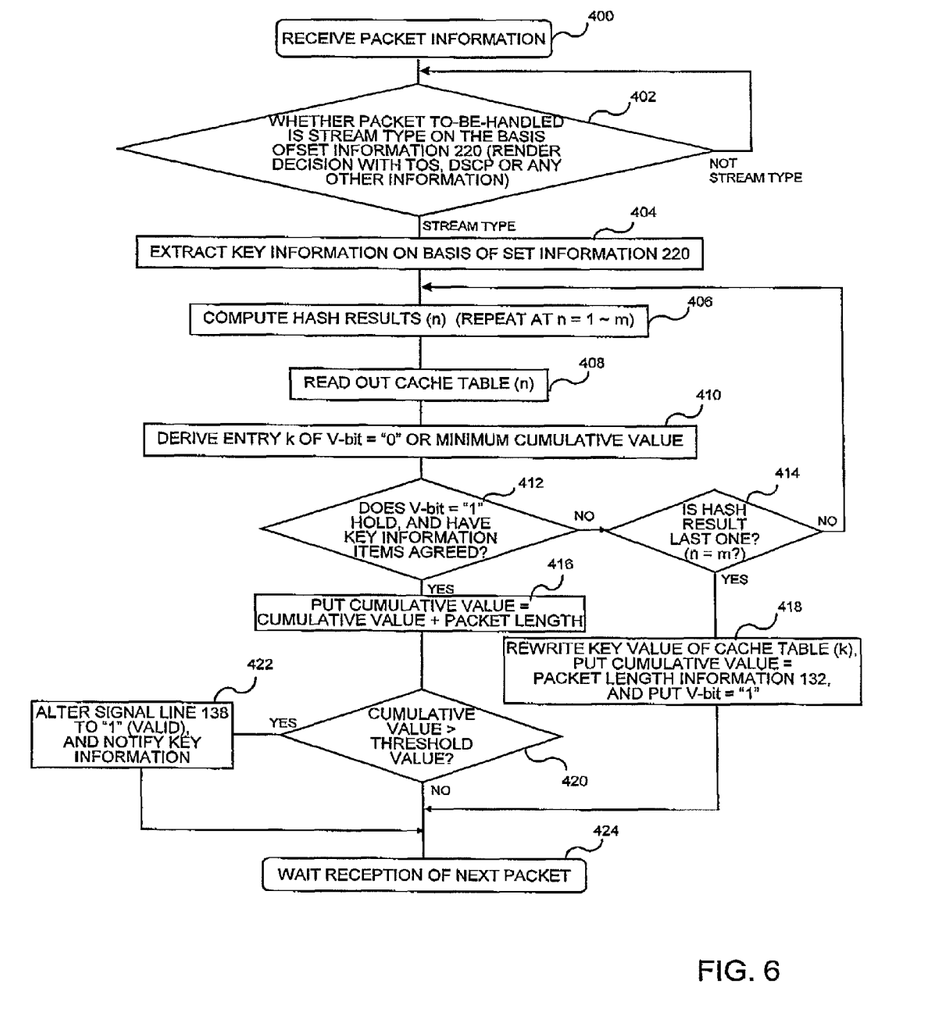
FIG. 6 is a flow chart of excessive flow detection.
Figure 7:
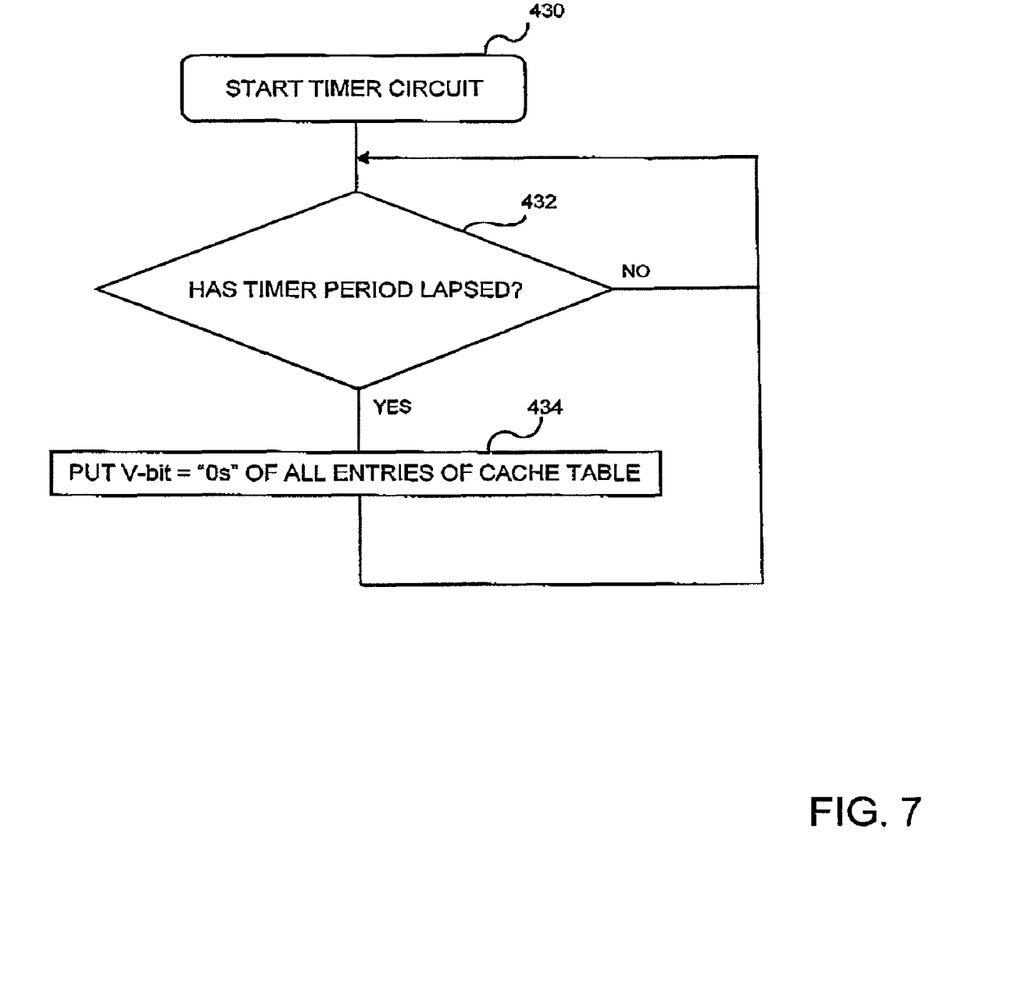
FIG. 7 is a flow chart of a reset operation based on a timer period.

FIG. 1 is a configurational block diagram of the excessive flow detection circuit 200. FIG. 6 is a flow chart of excessive flow detection. FIG. 7 is a flow chart of a reset operation based on a timer period.

Here, the operation of the excessive flow detection circuit 200 will be described on only the operation thereof for the voice queue 376. Voice traffics from general users are at, for example, 64 kbps. In this example, therefore, the upper-limit throughput value of the excessive traffic detection circuit 200 is set at 240 kbps (30 kilobytes/second). Any voice traffic exceeding the set value is decided as an excessive traffic. The operation of the excessive flow detection circuit 200 will be described in conjunction with the flow charts of FIGS. 6 and 7.

The excessive flow detection circuit 200 includes, for example, a packet information extraction circuit (extraction circuit) 102, a HASH result computation circuit (representative value computation circuit) 104, a cache table 106, a timer circuit 108, a comparator 110, an adder 112, a threshold value holding & comparing circuit 114, and a minimum value holding circuit 120. Incidentally, the comparator 110, the adder 112, the threshold value holding & comparing circuit 114, etc. may well be configured of appropriate control units or processing units.

In a case where the TOS information or the like identifier information of an IP packet as indicates, for example, a vocal service in packet information inputted from a signal line 130 has agreed with preset identifier information (step 402), the packet information extraction circuit 102 outputs KEY information derived from the input packet, to an extraction signal line 134 (step 404), and it outputs packet length information to an extraction signal line 132. By way of example, the packet information extraction circuit 102 is supplied with the packet or the header information thereof, and it extracts the preset KEY information from the header information of the packet. Besides, the packet information extraction circuit 102 extracts the packet length information contained in the header information or measures the packet length of the packet, thereby to obtain the packet length information of the packet.

Examples of the KEY information are transmission source address information, reception destination address information, and the SHIM header information of MPLS (multiprotocol label switching). Apart from these information items, the KEY information may well be any appropriate information which identifies, for example, a flow. In case of detecting the excessive flow from an input traffic to the information network or the apparatus, the transmission source information (a source IP address or the like) is used as the KEY information, and in case of detecting the excessive flow from an output traffic from the network or the apparatus, the destination information (a destination IP address or the like) is used as the KEY information. Regarding instructions as to which information items are to be used as the identifier information and the KEY information, instructions from the network manager are set in the packet information extraction circuit 102 through the signal line 220. By way of example, if the identifier information corresponds to a vocal traffic, the excessive flow detection circuit 200 becomes a circuit for detecting the excessive flow of the vocal traffic, whereas if the identifier information corresponds to a dynamic image traffic, the excessive flow detection circuit 200 becomes a circuit for detecting the excessive flow of the dynamic image traffic. Incidentally, either of the voice and the dynamic image is set, but both of them may well be set. Besides, any other traffic may well be set.

The HASH result computation circuit 104 computes a plurality of HASH results (representative values) on the basis of the KEY information, and outputs the HASH results to signal lines $h_1$-$h_m$ (where m denotes an integer of, at least, 2). Incidentally, any appropriate technique can be employed for the computation of the HASH result based on the KEY information. Besides, apart from the obtainment of the HASH result, one or more of a plurality of identification information items or a plurality of values may well be obtained on the basis of the KEY information.

The cache table 106 includes a KEY information field 106-1, a cumulative value field 106-2, and a V-bit field 106-3 indicating the validity/invalidity of the table (an entry) The addresses of the individual entries of the cache table 106 correspond to the plurality of HASH results which can be outputted from the HASH result computation circuit 104. In a case where the V-bit field 106-3 is "1" (valid), the KEY information of the signal line 134 is transferred to the KEY information field 106-1 via the comparator 110 and is held therein. The cumulative value of the packet lengths of the packets as corresponds to the KEY information is updated by the adder 112, and is held in the cumulative value field 106-2. Incidentally, the storage in the cache table 106, readout therefrom, etc. can be performed by appropriate processing units or control units.

The minimum value holding circuit 120 holds, for example, the HASH results, and the KEY information 106-1 and cumulative value information 106-2 which correspond to the HASH results. By way of example, when smaller values have been inputted in the cumulative value information 106-2 corresponding to the signal lines $h_1$-$h_m$, the held information items are updated and then held (step 410). Besides, the minimum value holding circuit 120 may well search for that one of the entries whose V-bit field 106-3 is "0", or the entry whose cumulative value field 106-2 has the minimum value, so as to store the information items of the entry. Incidentally, it may well store the address information of the table 106.

The threshold value holding & comparing circuit 114 compares the cumulative value held in the cumulative value field 106-2 and a preset and held threshold value (step 420). In a case where the cumulative value is larger than the threshold value, the circuit 114 alters, for example, a signal line 138 to "1" (valid), thereby to notify the result of the comparison together with the output signal 136 of the value of the KEY information field 106-1, to the CPU of the upper-layer processing unit 360 (step 422). The magnitude of the threshold value is a value for deciding whether or not a flow rate outputted during a timer interval set in the timer circuit 108 was a flow rate equal to or wider than the set band, every flow to-be-handled (here, every session of the telephonic voice). The value can be set as an upper-limit throughput value 210, together with the time interval value 230 (to be explained later) of the timer by the network manager beforehand.

The upper-limit throughput value in each flow unit in the stream type traffic is set as the threshold value in the threshold value holding & comparing circuit 114, and in a case where the cumulative value of the packet lengths has exceeded the threshold value, the key information corresponding to the cumulative value of the table 106 is notified to the upper-layer protocol as the information of a violative user flow.

The timer circuit 108 sends a signal to the cache table 106 every set time period (step 432), so as to reset (make "0s") all the entries of the V-bit field 106-3 (step 434).

The flow of the operation of the excessive flow detection circuit 200 will be described by referring chiefly to FIGS. 1 and 6.

In a case where packet information (a packet or the header information thereof) has been inputted from the signal line 130 (step 400), and where identifier information has agreed in the packet information extraction circuit 102 (step 402), KEY information is outputted to the extraction signal line 134 (step 404), and packet length information is outputted to the extraction signal line 132. By way of example, the packet information extraction circuit 102 compares the set information 220 with the header information of the input packet, and it decides whether or not the packet is of the stream type, depending upon whether or not the header information of the input packet corresponds to the set information 220. The decision can be rendered using, for example, TOS, DSCP or any other information as the header information of the packet. Besides, the packet length information 132 can be acquired from, for example, the header of the packet. Incidentally, the packet length may well be measured by inputting the whole packet.

The HASH result computation circuit 104 supplied with the KEY information from the signal line 134 computes a plurality of (m) HASH results on the basis of the KEY information and outputs the HASH results through the signal lines $h_1$-$h_m$ (where m denotes an integer of, at least, 2) (step 406). The cache table 106 receives the HASH results through the signal lines $h_1$-$h_m$. First, the entry of that position (address) of the cache table 106 which corresponds to the HASH result inputted through the signal line $h_1$ is specified, and the KEY information 106-1 of the entry is read out (step 408) and is transferred to the comparison circuit 110. The comparison circuit 110 compares KEY information from the cache table 106 and the KEY information from the packet information extraction circuit 102.

The minimum value holding circuit 120 specifies the entry whose V-bit is "0" or the entry (k) whose cumulative value is the minimum value, thereby to derive the identification information (for example, address) k for specifying the entry (step 410).

In a case where the V-bit field 106-3 of the pertinent entry is "1" (valid) and where the comparison of the KEY information items by the comparison circuit 110 has resulted in agreement (step 412: Yes), the cumulative value of the packet lengths of the packets corresponding to the KEY information is updated by the adder 112 and is then held in the cumulative value field 106-2 (step 416). By way of example, the cumulative value 106-2 of the pertinent entry is read out from the cache table 106 and is outputted to the addition circuit 112, and the addition circuit 112 updates the cumulative value by adding up the cumulative value from the cache table 106 and the packet length information from the packet information extraction circuit 102, so as to store (overwrite) the updated cumulative value in the cumulative value 106-2 of the pertinent entry of the cache table 106.

On the other hand, in a case where the V-bit field 106-3 is "0" (invalid) or where the comparison of the KEY information items in the comparison circuit 110 has resulted in disagreement (step 412: No), the above operation is repeated until the HASH result of the signal line $h_m$ is reached (steps 406-414). The operation in the case where the comparison has resulted in agreement midway, is the same as the processing of and after the step 416, for the signal line $h_1$.

In a case where all the entries of the V-bit field 106-3 are not "0s" (invalid) and where the KEY information items disagreed to the last (step 414), the information items of the entry whose cumulative value field 106-2 has the minimum value, among the entries corresponding to the signal lines $h_1$-$h_m$, are rewritten on the basis of the information (for example, address k) of the minimum value holding circuit 120 (step 418), as follows: The KEY information field 106-1 of the corresponding entry (k) is rewritten into the KEY information of the signal line 134, the cumulative value field 106-2 is rewritten into the packet length information on the signal line 132 as corresponds to the KEY information, and the V-bit field 106-3 is rewritten into "1" (valid) (step 418).

In a case where any entry of the V-bit field 106-3 is "0" (invalid), the KEY information field 106-1 of, for example, the first entry whose V-bit field 106-3 is "0" is rewritten into the KEY information of the signal line 134, the cumulative value field 106-2 is rewritten into the packet length information on the signal line 132 as corresponds to the KEY information, and the V-bit field 106-3 is rewritten into "1" (valid) (step 418). Incidentally, any other appropriate entry whose V-bit field 106-3 is "0" may well be rewritten.

In a case, for example, the cumulative value updated at the step 416 exceeds a threshold value at a step 420 (step 420: YES), the signal line 138 is altered to "1" (valid), thereby to notify the result of the comparison together with the output signal 136 of the value of the KEY information field 106-1, to the CPU of the upper-layer processing unit 360 (step 422).

Owing to the above operation, the minimum entry of the cumulative value field 106-2 has its value rewritten, but the other entries are not rewritten. Accordingly, the entries of larger cumulative values are always left behind, whereas a new entry can be added anew as a latent candidate for an excessive flow entry, by the rewriting. Moreover, the excessive flow can be detected under the condition that the number of entries of the table does not depend upon the number of flows. The above operation is performed within a time period (for example, 100 ms) measured by the timer circuit 108, with the result that the excessive flow (of or above, for example, 3 kilobytes/second, namely, 30 kilobytes/second×100 ms) can be detected. After the lapse of the time period measured by the timer circuit 108, all the entries of the V-bit field 106-3 are once reset to "0s" (invalid), and the detection of the excessive flow is started again for a new timer period.

(Application Example 1 to Ether Switch)

The above example has been an example in which the excessive flow detection circuit and the traffic shaping unit in the embodiment are applied to the Ether transmission terminal, but as stated before, an excessive flow detection circuit and a traffic shaping unit can be disposed in relevant places within a network or an apparatus.

Figure 4:
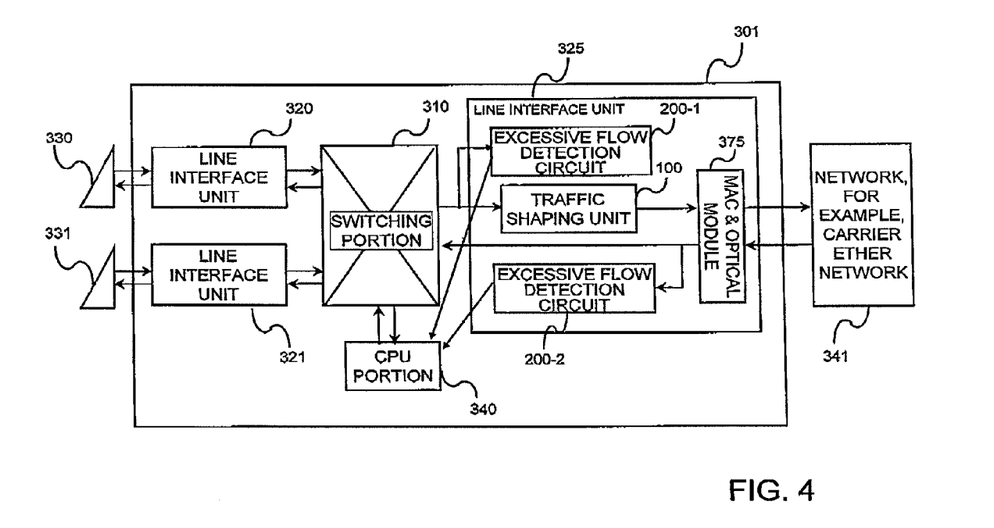
FIG. 4 is a configurational block diagram in the case where the excessive flow detection circuit is applied to a packet exchange system of line interface type.

FIG. 4 shows a configurational diagram in which the excessive flow detection circuit and the traffic shaping unit are applied to an Ether switch 301 (a relay point from a private network to a public network) connected to a carrier Ether network 341 (application example 1 to the switch).

The Ether switch 301 includes first line interface units 320 and 321 for respective Ether terminals 330 and 331, a switching portion 310, a second line interface unit 325 for the carrier Ether network 341, and a CPU portion 340. The second line interface unit 325 has the traffic shaping unit 100, the excessive flow detection circuit 200 and a MAC & OPTICAL MODULE 375 which correspond to the carrier Ether network 341. The traffic shaping unit 100 and the excessive flow detection circuit 200 are the same in configuration and operation as in the foregoing. Incidentally, information items which are set in the traffic shaping unit 100 and the excessive flow detection circuit 200 can be set by, for example, the CPU portion 340.

Incidentally, as shown in FIG. 4, the excessive flow detection circuit 200 may well consist of a first excessive flow detection circuit 200-1 which detects any excessive flow as regards a traffic (for example, a vocal traffic) toward the carrier Ether network 341, and a second excessive flow detection circuit 200-2 which detects any excessive flow as regards a traffic (fox example, a dynamic image traffic) from the carrier Ether network 341.

(Application Example 2 to Ether Switch)

As another application example to an Ether switch, there will be described an excessive flow detection circuit 200 and a traffic control circuit 101 of trunk scheme wherein the traffic shapings of a plurality of lines are performed by one traffic control circuit.

Figure 5:
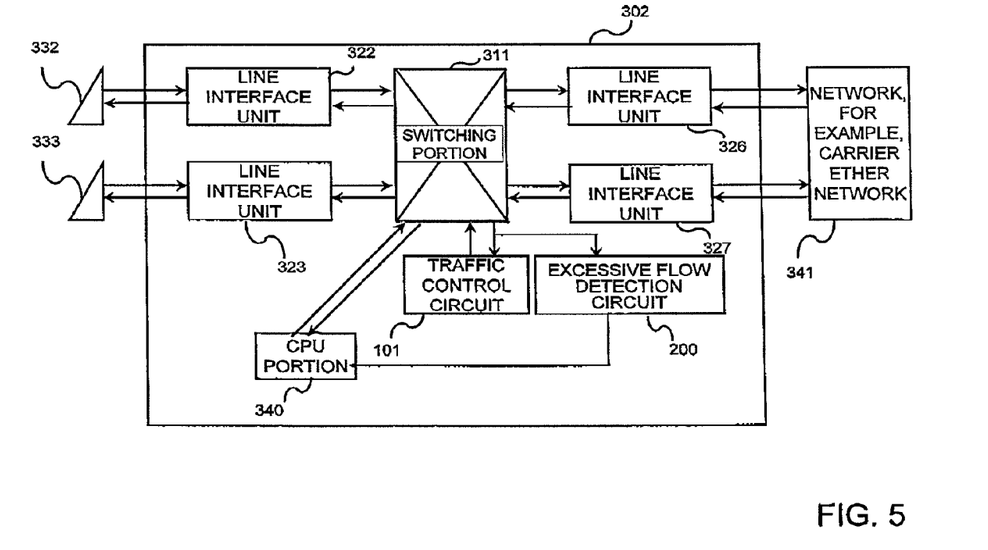
FIG. 5 is a configurational block diagram in the case where the excessive flow detection circuit is applied to a packet exchange system of trunk type.

FIG. 5 shows an example in which an Ether switch is configured as a traffic shaping circuit or traffic monitoring circuit (UPC circuit) of the trunk scheme (application example 2 to the switch).

Packet flows generated by terminals 332 and 333 are inputted to a switching portion 311 through the respective line interface units 322 and 323 of the Ether switch 302. Whichever output destination line has been determined in the switching portion 311, packets are temporarily transferred to the traffic control circuit 101. The traffic control circuit 101 includes, for example, the traffic shaping unit described before. The traffic shaping unit and the excessive flow detection circuit 200 are the same in configuration and operation as in the foregoing.

The output packets of the traffic control circuit 101 are passed through the switching portion 311 again, and are transmitted to a carrier Ether network 341 from a line interface unit 326 or 327 of a corresponding output line. When the packets outputted from the traffic control circuit 101 are accumulated in the packet buffer of the switch, traffic shaping processing executed by the traffic control circuit 101 becomes meaningless, and hence, the packets transmitted from the traffic control circuit 101 must be transferred to the network 341 most preferentially. Besides, any excessive flow can, of course, be detected by employing the excessive flow detection circuit 200 alone without the traffic control circuit 101, and this aspect is effective. Incidentally, the same holds true also of packets inputted through the line interface unit 326 or 327 from the network 341.

The present invention pertains to an excessive flow detection circuit and the scheme thereof in, for example, a transmission terminal for fixed-length/variable-length packets or a network node (such as router). As an application part, the excessive flow detection circuit is suitable for the vicinity of, for example, a traffic shaping circuit or a band monitoring circuit. It is also effective to employ the excessive flow detection circuit alone within the network node. Especially, the excessive flow detection circuit is suitable for a node which is applied to a multi-service network that renders vocal and video services requiring transfer qualities of low delays and fluctuations.

What is claimed is:

1. An excessive flow detection circuit comprising:
    an extraction circuit to which a packet or header information of the packet is inputted, which derives predetermined key information from the header information of the packet, and which derives packet length information contained in the header information or which measures a packet length of the packet, thereby to obtain packet length information of the packet;
    a representative value computation circuit which computes one or plurality of representative value from a plurality of predetermined values, on the basis of the key information derived by said extraction circuit;
    a table which has a plurality of entries respectively corresponding to the plurality of values, and in which each of the entries holds key information and a cumulative value of the packet lengths;
    a comparison circuit which compares the key information of the entry corresponding to the representative value computed by said representative value computation circuit and the key information derived by said extraction circuit, with reference to said table;
    an addition circuit which adds the packet length information obtained by said extraction circuit, to the cumulative value of the packet lengths in the pertinent entry, in a case where the key information items have agreed in said comparison circuit; and
    a threshold value comparison circuit which notifies excessive flow detection and/or outputs the key information corresponding to the cumulative value, in a case where the cumulative value of the packet lengths stored in said table has exceeded a preset threshold value,
    wherein when results of the comparisons between the key information of the entry and the key information derived by said extraction circuit disagree as to all the entries corresponding to the one or plurality of representative value computed, the entry whose cumulative value is a minimum in said table is specified, the key information derived by said extraction circuit is stored into the specified entry, and the packet length information obtained is written as the cumulative value of the specified entry anew.

2. An excessive flow detection circuit as defined in claim 1, wherein the key information is one of destination information of the packet, transmission source information of the packet, SHIM header information of multiprotocol label switching, and VLAN information.

3. An excessive flow detection circuit comprising:
    an extraction circuit to which a packet or header information of the packet is inputted, which derives predetermined key information from the header information of the packet, and which derives packet length information contained in the header information or which measures a packet length of the packet, thereby to obtain packet length information of the packet;

a representative value computation circuit which computes one or plurality of representative value from a plurality of predetermined values, on the basis of the key information derived by said extraction circuit;

a table which has a plurality of entries respectively corresponding to the plurality of values, and in which each of the entries holds key information and a cumulative value of the packet lengths;

a comparison circuit which compares the key information of the entry corresponding to the representative value computed by said representative value computation circuit and the key information derived by said extraction circuit, with reference to said table;

an addition circuit which adds the packet length information obtained by said extraction circuit, to the cumulative value of the packet lengths in the pertinent entry, in a case where the key information items have agreed in said comparison circuit; and a threshold value comparison circuit which notifies excessive flow detection and/or outputs the key information corresponding to the cumulative value, in a case where the cumulative value of the packet lengths stored in said table has exceeded a preset threshold value, wherein when results of the comparisons between the key information of the entry and the key information derived by said extraction circuit disagree as to all the entries corresponding to the one or plurality of representative value computed, the key information derived by said extraction circuit is stored into a predetermined entry, and the packet length information obtained is stored as the cumulative value of the predetermined entry anew.

4. An excessive flow detection circuit as defined in claim 1, further comprising:

a minimum value holding circuit which holds one or plurality of the representative value corresponding to the entry of the minimum cumulative value in said table, and the key information and the cumulative value of the corresponding entry;

wherein the entry of the minimum cumulative value in said table is specified on the basis of the information held in said minimum value holding circuit.

5. An excessive flow detection circuit as defined in claim 1, wherein:

the representative values are Hash results; and said representative value computation circuit computes the plurality of Hash results on the basis of the key information.

6. An excessive flow detection circuit as defined in claim 1, further comprising:

a timer circuit which measures a predetermined time period, and which invalidates the cumulative values of said table every predetermined time period.

7. An excessive flow detection circuit as defined in claim 1, wherein:

identification information for identifying that the packet is a packet for the excessive flow detection is previously set in said extraction circuit; and said extraction circuit derives the key information and obtains the packet length information, for the inputted packet whose header information has the set identification information.

8. An excessive flow detection circuit as defined in claim 7, wherein the identification information set in said extraction circuit is information for identifying a voice or a dynamic image, and any excessive flow is detected as to vocal or dynamic image packets.

9. An excessive flow detection circuit as defined in claim 1, wherein regarding packets from a network, destination information of the packet is used as the key information which is derived by said extraction circuit.

10. An excessive flow detection circuit as defined in claim 1, wherein regarding packets toward a network, transmission source information of the packet is used as the key information which is derived by said extraction circuit.

11. An excessive flow detection circuit comprising:

an extraction circuit to which a packet or header information of the packet is inputted, which derives predetermined key information from the header information of the packet, and which derives packet length information contained in the header information or which measures a packet length of the packet, thereby to obtain packet length information of the packet;

a representative value computation circuit which computes one or plurality of representative value from a plurality of predetermined values, on the basis of the key information derived by said extraction circuit;

a table which has a plurality of entries respectively corresponding to the plurality of values, and in which each of the entries holds key information and a cumulative value of the packet lengths;

a comparison circuit which compares the key information of the entry corresponding to the representative value computed by said representative value computation circuit and the key information derived by said extraction circuit, with reference to said table;

an addition circuit which adds the packet length information obtained by said extraction circuit, to the cumulative value of the packet lengths in the pertinent entry, in a case where the key information items have agreed in said comparison circuit; and a threshold value comparison circuit which notifies excessive flow detection and/or outputs the key information corresponding to the cumulative value, in a case where the cumulative value of the packet lengths stored in said table has exceeded a preset threshold value, wherein an upper-limit throughput value of each flow unit in a stream type traffic is set as the threshold value in said threshold value comparison circuit, and when the cumulative value of the packet lengths has exceeded the threshold value, the key information corresponding to the cumulative value in said table is notified to an upper-layer protocol as information of a violative user flow.

12. A terminal apparatus comprising:

a processing unit; and a line interface unit which includes the excessive flow detection circuit as defined in claim 1, and which communicates with a network;

wherein said excessive flow detection circuit inputs packets which are outputted from said processing unit toward the network or header information of the packets, and detects any excessive flow.

13. A terminal apparatus as defined in claim 12, further comprising:

a traffic shaping unit which includes a plurality of queues, and a distribution circuit that distributes the packets to the plurality of queues on the basis of priority levels contained in the header information items of the packets and/or identification information indicating a packet sort, and a readout circuit that reads out and outputs the packets from the queues in accordance with the priority levels, and which transmits the packets at transmission intervals that observe a contracted band with the network.

14. A network node comprising:
a first line interface unit for a terminal apparatus;
a second line interface unit for a network, which includes the excessive flow detection circuit as defined in claim 1; and
a switching portion which is connected with said first line interface unit and with said second line interface unit;
wherein said excessive flow detection circuit detects any excessive flow as to packets from said switching portion toward the network, or/and packets from the network toward said switching portion.

15. A network node as defined in claim 14, wherein said excessive flow detection circuit includes:
a first excessive flow detection circuit which detects the excessive flow of the packets from said switching portion toward the network; and
a second excessive flow detection circuit which detects the excessive flow of the packets from the network toward said switching portion.

16. A network node as defined in claim 15, wherein:
said first excessive flow detection circuit detects the excessive flow as to the packets of a vocal traffic; and
said second excessive flow detection circuit detects the excessive flow as to the packets of a dynamic image traffic.

17. A network node comprising:
a first line interface unit for a terminal apparatus;
a second line interface unit for a network;
the excessive flow detection circuit as defined in claim 1; and
a switching portion which is connected with said first line interface unit, with said second line interface unit and with said excessive flow detection circuit;
wherein said excessive flow detection circuit inputs packets from said first line interface unit and/or said second line interface unit, or header information items of the packets through said switching portion, and detects any excessive flow.

18. A network node as defined in claim 14, further comprising:
a traffic shaping unit which includes a plurality of queues, and a distribution circuit that distributes the packets to the plurality of queues on the basis of priority levels contained in the header information items of the packets and/or identification information indicating a packet sort, and a readout circuit that reads out and outputs the packets from the queues in accordance with the priority levels, and which transmits the packets at transmission intervals that observe a contracted band with the network.

* * * * *